United States Patent Office 3,128,189
Patented Apr. 7, 1964

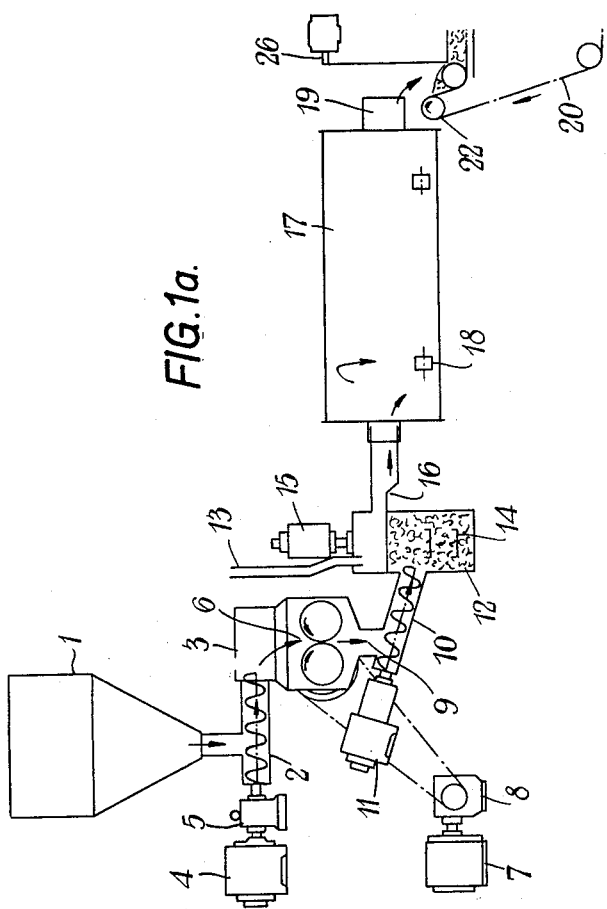

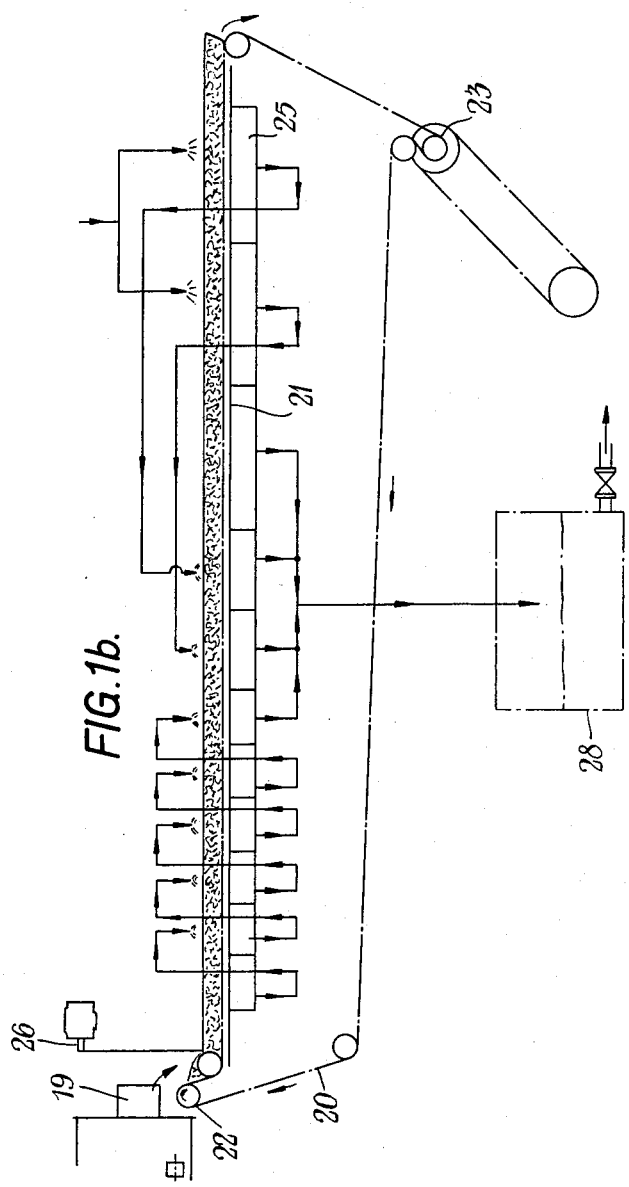

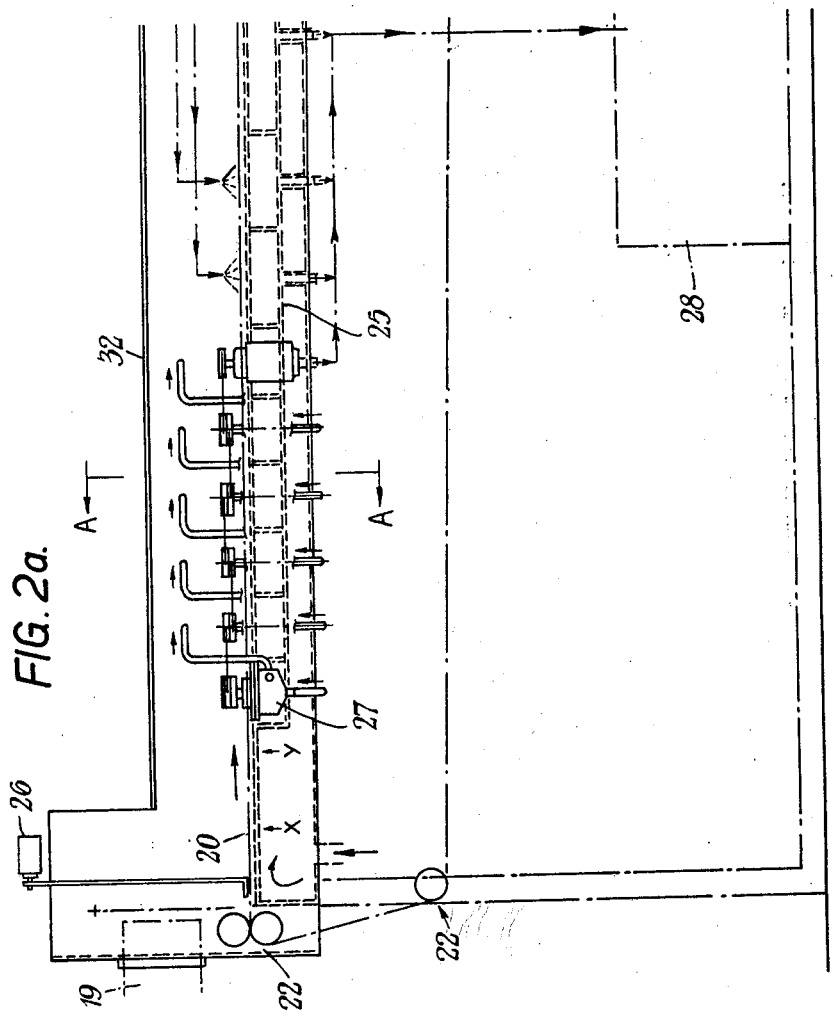

3,128,189
METHOD FOR PREPARING BREWERS' WORT
Percy Henry Watts, Pinner, Michael Edward Ash, Ealing, London, and George Cordery Phillpotts, Putney, London, England, assignors to Arthur Guinness Son and Company (Park Royal) Limited, London, England, a British company
Filed Apr. 10, 1962, Ser. No. 186,456
Claims priority, application Great Britain Apr. 14, 1961
16 Claims. (Cl. 99—51)

This invention relates to a process for the treatment of brewers' wort and is concerned primarily with the removal of solid particles from the wort at varying stages during the brewing process as a whole.

In what we believe to be its most important aspect, the invention is directed towards providing improvements in that stage of the brewing process known as "mashing." However the invention may also be applicable in that subsequent stage of the brewing process known sometimes as "hopping" and sometimes as "boiling," which stage consists essentially in boiling hops in wort, to extract flavouring substances from the hops and impart them to the wort.

Mashing broadly comprises an initial step called "conversion" which entails mixing ground malted grain (frequently called "grist" by brewers) with hot water to produce a porridge-like mixture termed "mash," and maintaining this mash at a controlled temperature or series of temperatures for a period sufficient to convert the starches in the grain into sugars which pass into solution in the water. The conversion step is then followed by a filtration step, in which the sweet liquid component of the mash, which brewers term "wort" is extracted and separated by any suitable means, from the solid components, namely the so-called "spent" grains from which the starches have been removed by the conversion step. It is well known to brewers that the conversion step itself can be carried out either intermittently or continuously, and in a variety of ways, according to the plant available, and the requirement of the type of beer being brewed.

The traditional infusion mashing process broadly involves mixing grist with hot water into mash which is passed into large vessels called mash tuns. These are operated intermittently, that is to say a batch of mash is fed to a mash tun and, after a suitable period of conversion, during which the mash is maintained at one or more appropriate temperatures to convert the starches in the mash into sugars, the resultant sweet liquid or wort is drained off from the bottom of the mash tun. When draining commences, the grains are in suspension in the mash, but the action of draining through the perforate floor of the mash tun settles the grains on this floor so that they finally form a filter bed which may be as much as six feet in depth in the normal mash tun and through which the remaining liquid passes. As the initial runnings are inevitably cloudy, these may be re-circulated so that they pass again through the filter bed. A deep filter bed of this kind renders filtration on a slow process and moreover after the wort has been drawn off, it is necessary to sparge the bed of spent grains in the mash tun with water, in some cases for a period of several hours, to secure high extractive efficiency. The cleaning of these large mash tuns, which has to take place between every batch is a difficult and laborious process which adds to the length of time between the processing of successive batches.

A continuous mashing process has also been proposed in which the mash is passed at a controlled rate through a tower, being allowed to remain in this tower for a suitable conversion period and being maintained at an appropriate temperature or range of temperatures during the process. Separation occurs as the spent grains emerge from the top or bottom of the tower. The rates of feed of water and malted grain and rates of take-off, may be controlled separately or together. It has been found that a continuous process of this kind tends to result in cloudy wort, because the grains are kept in suspension throughout the process and are inevitably subject to movement and agitation which results in fine particles passing out in suspension in the wort and making it cloudy. Thus a further filtration step is required, which tends to make the process more expensive.

A further mashing process has been suggested in United Kingdom Patent 852,561 in which the preparation of wort comprises feeding mash in separate quantities into separate compartments defined in a circular vessel by a plurality of angularly spaced members rotating about the axis of said vessel, successively holding the mash over an imperforate section during the period necessary for conditioning the mash (i.e. conversion) and for settlement of the spent grains to form a filter bed, carrying the mash over a perforate section of the vessel floor for a sufficient time to permit adequate separation of the wort from the grains, collecting the separated wort and carrying the spent grains over a discharge section of the vessel floor to remove the grains from the vessel. This process also may involve re-circulation of the wort when it is drawn off from the various compartments.

The term "re-circulation of wort" is intended in this specification to denote the sparging, over some part of the filter bed, of wort drawn from beneath the same part or from beneath some other part of the filter bed.

We have found that the gradual movement of the mash laterally over the floor of the vessel, tends to disturb the filter bed after it has settled, and thus to impair the clarity of the filtered wort. In addition, whilst it is possible to discharge a substantial part of the spent grains through an aperture in the floor of the vessel, relatively complex sealing arrangements are required to prevent loss of wort through this discharge opening.

It is an object of our invention to provide a continuous filtration system for brewers' wort for removing solids therefrom. The system can be used both for removing grain solids from the wort after the conversion step of mashing; it can also be used for removing hop solids from wort after the hopping or boiling step which follows the mashing stage.

It is also an object of our invention to provide a mashing process in which at least the filtration step can be operated continuously. In particular, we aim to provide a continuous filtration system which can incorporate the conversion step within itself, or can be used as a final step in the mashing process following a separate conversion step, such for example as that carried out in the above-mentioned tower process or described in our co-pending application No. 186,558.

For most efficient operation in a continuous mashing operation, it is desirable to provide, initially, means for continuously carrying out conversion of mash at a controlled rate and under variable temperature conditions so that conversion appropriate to the differing requirements of the brewer of stout, porter or ale and of the brewer of lager for example, may be carried out using the same equipment without substantial changes.

Our filtration step utilises one or more conveyor belts to move the mash during filtration, in a more or less horizontal plane—although a slight degree of inclination may be allowed. The main direction of linear movement is horizontal and, for convenience, the starting end of the process is herein called the "upstream" end and the finishing end the "downstream" end.

The principle of utilising endless perforated belts as filters for removing suspended solids from liquids is well known in many fields, for example in paper preparation;

and in the production of kaolin. Moreover, in West German patent specification No. 1,058,958 this technique has been proposed for filtering brewers mash. This West German specification discloses a process and apparatus in which mash is fed on to the upstream end of a perforate endless filter belt, which is supported at three widely spaced intervals along its upper run by two guide rolls. Between the upper and lower runs of the belt are collecting pans, and as the mash passes from the upstream to the downstream end of the upper run, wort in diminishing strengths is collected in the underlying pans. After the first runnings of strong wort have been collected upstream, liquor is sparged over the moving bed of mash and this lixiviates the grains. The belt may also comprise moving filter screens, the use of vibration is suggested to accelerate the filtration process. This specification points out that the filtering and separation of the wort from the grains is effected principally by the filter belt, but to a lesser extent by the bed of grains on the belt. It is clear that the process described in West German Patent No. 1,058,958 must rely almost entirely on the perforated belt to act as a filter, since any applied vibration such as is suggested, would disturb the bed of grains on the belt and largely nullify its supplementary filtration effect. It is also clear that the escape of liquid through the filter bed is intended to be rapid, since a pressing device is described for squeezing the mash part way along the belt.

By contrast our invention, whilst utilising the principle of an endless perforated belt as a filter bed carrier relies on this belt not as a filter but as a base to support the coarsest grains so that a filter bed of settled grains can build up on the belt, this moving settled bed operating as the filter medium in the same way as does the bed in the mash tun of the traditional batch process.

According to our invention in its broadest aspect, we provide a continuous filtration process for removing particulate solid materials carried in brewers' wort, which comprises conveying a mixture of said wort and said solid materials continuously and at a controlled rate in a substantially horizontal linear direction through a filtration zone by a perforate conveyor moving in a trough; causing said solid materials to settle on said moving conveyor to form a settled and mechanically undisturbed filter bed of particles; moving said filter bed smoothly over a perforate platform above a wort-collecting zone; draining wort through said filter bed, said perforate conveyor and said perforate platform, and collecting wort, and removing said solids from said conveyor at the downstream end of said filtration zone.

The wort collecting zone underneath the filtration zone may be divided into a series of compartments. These compartments, or groups of compartments, are used to collect differing qualities and strengths of wort, according to the particular region of the filtration zone beneath which they are located.

One or more compartments located beneath the bed at the upstream end of the filtration zone (herein called "the stabilising region") is used to collect the first runnings of the wort. These tend to be cloudy until draw-off has proceeded long enough for substantially all particles in suspension to have lodged on or in the interstices between the larger particles in the filter bed. The initial drawing off of wort while the particles are settling is herein called "stabilising the bed."

If extreme clarity of wort is desired, the first runnings of wort, which of necessity will contain some small solid particles entrained in them, may be recirculated and sparged at least once over the filter bed, so as to filter out these small particles.

The region of the bed immediately downstream of the stabilising region is herein called "the production region." Wort passing through the bed to the underlying compartments at the upstream end of the production region will be strong and may either be recirculated or collected for subsequent use. At the downstream end of the production region, it is preferred to sparge the bed with hot water so that weak wort is run off and collected in the compartments below this part of the bed. This weak wort may either be added to the strong wort being run off, or may be sparged over the bed in the intermediate or upstream part of the production region.

At the downstream end of the filtration zone beyond the production region there is a further region (herein called the "drainage region"). Preferably the filter bed is sparged with hot water in this region to extract the last amount of useful material from the solids, thus producing a weak wort. The weak wort from the drainage region is run off and directed through one or more underlying compartments, being thereafter normally sparged over the bed in the production region. In some cases, it may be found preferable to feed some or all of the weak wort from the drainage region directly into the outflow of strong wort from the production region.

It will be obvious that there is no definite line of division between the three regions above-mentioned since the filter bed is continuous, and it is a matter of choice for the particular brewer where he will cease re-circulating the first runnings of wort, or where he will sparge with water at the downstream end, or where he will sparge with weak wort in the production zone.

We have found that it is desirable to produce a gradual lowering of liquid level in the bed from the upstream to the downstream end of the filtration zone. Where the conveyor is level or is sloping downwardly from upstream to downstream, this may be effected by passing the outflow from successive collecting compartments over a series of weirs of progressively decreasing height until finally at the last compartments in the drainage zone, it is drawn off without the weir so as to drain the bed completely. Preferably, the conveyor may run slightly upwardly from the upstream to the downstream end of the filtration zone.

Another aspect of our invention consists in its application particularly to the mashing stage of the brewing process, and for this we provide a process which comprises passing mash continuously and at a controlled rate through one or more conversion zones, maintained at one or more temperatures according to the required nature of the wort, and thereafter in a substantially horizontal linear direction into and through a filtration zone in which a perforate conveyor, moving in a trough, carries a settled and mechanically undisturbed filter bed of grains over a perforate platform above a wort collecting zone; collecting wort from the underside of said filter bed, and removing spent grains from the conveyor, at the downstream end of the filter bed.

In some cases we may arrange our process so that conversion and filtration are both being carried out concurrently in time, but in sequence in space, on the same perforated conveyor, while the mash is being moved along. If this is required, the length of the conveyor may be extended upstream of the filtration zone so that it passes first over an imperforate platform of suitable length, which is heated at the appropriate place or places to the required temperature or temperatures necessary to effect conversion. The dwell of the mash in the conversion zone so formed, will be dependent upon the speed of the conveyor and the length of the conversion zone. We prefer to pre-mix the water and grist before passing it to the conversion zone to enhance the regular consistency of the mash.

Alternatively we may employ the improved conversion method described in our co-pending application No. 186,558 in conjunction with our filtration operation, in cases where it is not desired to carry out conversion on the perforated conveyor.

The conversion step of co-pending application No. 186,558 broadly comprises passing the mash in a controlled flow into and through at least one heated conversion zone defined by the interior walls of a hollow drum or cylinder of which the longest axis is substantially horizontal but may be inclined slightly, the inlet level to this zone being higher than the outlet level therefrom; continuously agitating the mash mechanically within the conversion zone whereby the components of the mash are prevented from separating and finally passing the mash, without extracting wort therefrom, away from the conversion zone and towards a filtration zone.

Our improved process has the following advantages over the traditional method of mashing. First, it is a continuous rather than a batch process and control over the rates of feed, temperatures and other variable factors can be exercised more closely. Any changes in the wort being produced can be corrected rapidly by controlling these variables severally or independently; moreover, by the use of an automatic wort sampler and tester, such changes may to a large extent, be carried out automatically by linking the sampling and testing mechanism to the mechanisms which operate controls for the variables. Second, the use of a perforated conveyor to provide a moving filter bed, enables a relatively shallow bed to be maintained, which can be no more than a few inches in depth as compared with the traditional bed of several feet in a mash tun. This results in much more rapid filtration. Thirdly, the linear separation of the conversion step from the filtration step in our process, enables conversion conditions, such as times and temperatures, to be varied according to the type of wort required, without affecting the remainder of the process.

As compared with the known continuous tower process mentioned earlier in this specification, our filtration process only takes place when the bed has formed and thus tends to produce a clearer wort, despite the fact that we may use a conversion operation such as that described in our co-pending application No. 186,558 which involves continuous agitation of the mash and hence violent disturbance of the grist particles during conversion.

As compared with the rotary segmental masher of United Kingdom Patent 852,561, our process is truly continuous, whereas the rotary segmental masher involves the splitting up of the mash into continuously moving batches. Moreover, in our process we separate the conversion step from the filtration step, as already mentioned, even in the case where both steps take place on the perforated conveyor. Further, although Patent 852,561, involves a considerably shallower bed (and hence more rapid filtration) than that of a conventional mash tun (e.g. from one to six inches as against up to six feet) process as mentioned earlier, permits an even shallower bed than this to be employed economically, with correspondingly greater filtration speed.

Lastly, the movement of the mash across and relative to the stationary floor of the rotary masher, after the bed has settled, inevitably results in some degree of disturbance of the lowermost layer of particles in the bed, and thus a cloudy wort may still result, even though recirculation is carried out. By contrast, in our process the bed is formed on the moving perforated conveyor which is supported along its full length and is not vibrated. Once the bed has been formed it is not disturbed mechanically and is never caused to move relative to that conveyor until filtration has been completed and the time comes for spent grains finally to be removed from the conveyor. This enables the grain particles when settled to be used as the filter medium, by contrast to the apparatus of West German specification No. 1,058,958, in which the perforated conveyor belt, even if not vibrated, serves as the main filter medium.

One embodiment of apparatus for carrying out the process of our invention will now be described with reference to FIGURES 1 to 4 of the accompanying diagrammatic drawings in which:

FIGS. 1a and 1b, combined, constitute a diagrammatic general arrangement of the filtration equipment to show the relationship of the various components.

FIGS. 2a and 2b, combined constitute a part sectional side elevation of the mash filtration apparatus.

Figure 2B:
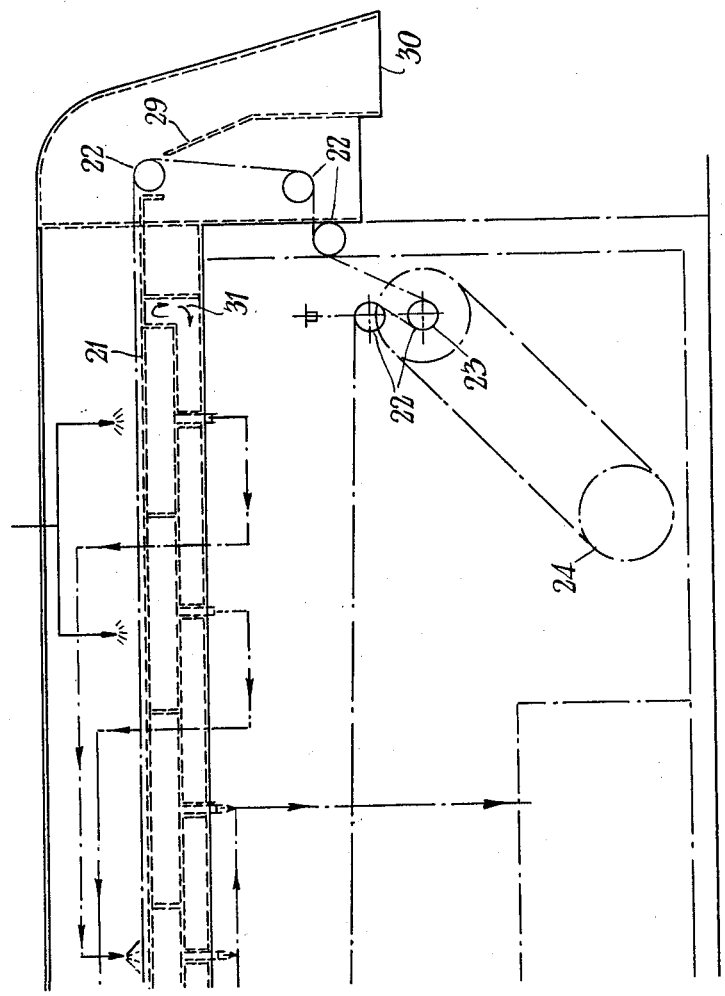

In this embodiment the conversion step is carried out in a rotating drum which forms the subject of our co-pending application No. 186,558.

Referring to FIG. 1a the mash, which has been converted by any suitable continuous conversion step, is deposited on to a conveyor belt 20.

The mash is spread on the belt by a spreader 26, the belt is guided by rollers 22 and driven by roller 23 (FIG. 1b). As the belt travels along the mash gradually stabilises and forms a filter bed through which liquid will pass. Under the belt are troughs 25 for collecting wort which has passed through the filter bed, and arrangements for re-circulating some of the collected wort. Wort is finally collected in tank 28.

The filtration of the wort will now be described in detail with reference to FIGS. 2a, 2b, 3 and 4 of the drawings. The belt 20 which is made of 20 mesh nylon is carried on a perforated support formed by a series of slotted plates 21 (FIG. 2b), although at the region on the belt where the mash is deposited the support is imperforate.

If desired, this imperforate region may be extended and may be heated so that conversion of the mash is partly carried out in this zone.

The belt travels around a series of rollers 22, and is driven by roller 23 which is connected to a suitable source of power, e.g. an electric motor 24. As the belt travels along, the mash gradually stabilises and forms a filter bed through which liquid will pass. Underneath the slotted plates 21 are arranged a series of tanks 25, which form juxtapositioned troughs, sealed from one another, for different regions along the length of the belt.

As soon as the mash has been deposited on the belt it is spread by a movable arm or spreader 26, so that the solid particles in the mash are deposited evenly over the width of the belt. The mash then passes along the apparatus on the belt over three regions constituted by batches of collecting tanks. Above the first batch of collecting tanks, which is sub-divided into five sections, the mash completes its stabilising process in which a filter bed is formed. This is the stabilising region. When the mash is above the first section any liquid which passes through the belt is collected and re-circulated by the pump 27 to a point above the second section so that it again passes through the filter bed for subsequent re-circulation to the third section. This re-circulation continues until the wort has been passed through the filter bed several times, after which point the wort is collected and passed to the main collecting tank 28. As the mash continues downstream it passes to the second region—the production region—and after that to a third region—the drainage region. While it is in the third region, hot water is spread on to it; this water extracts the last amount of useful material from the mash on the bed to form weak wort. This weak wort is then pumped over the production region and spread on to the mash in this region. The wort collected is then passed to the main collecting tank.

When the mash is conveyed past the third zone it is removed from the belt, e.g. by a scraper 29, and is ejected from the outlet 30. The belt then continues underneath the apparatus until it again collects fresh mash from the outlet 19.

To clean the nylon belt, a flow of water may be employed passing through it in the reverse direction to the wort. This may be done while the belt is underneath the apparatus.

The belt and collecting tanks are confined within a heating container having a steam-heated jacket 31. The top of the container 32 is made from a sheet of polymethyl methacrylate, thus allowing the filter bed operation to be inspected.

Figure 3:
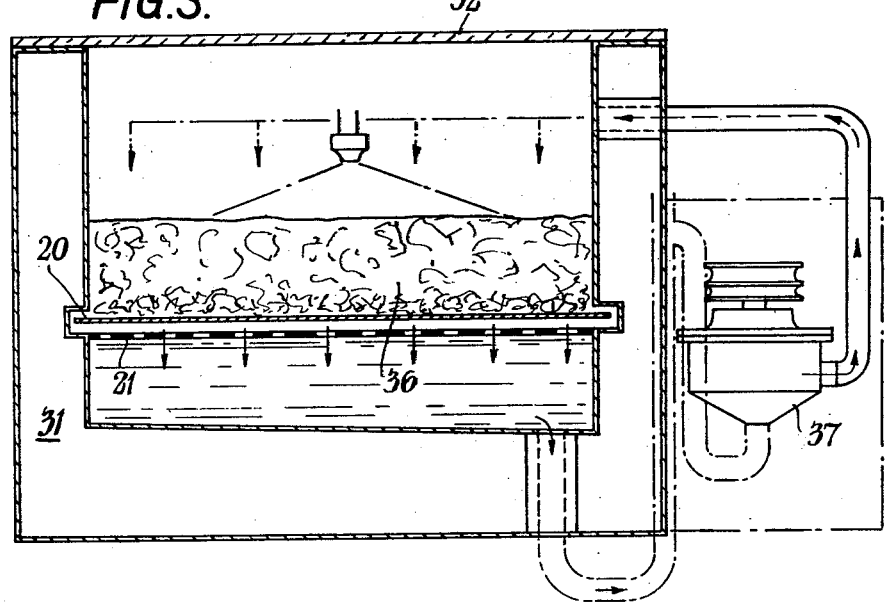
FIG. 3 is a cross-sectional view on the line A—A of FIG. 2 with some mash in place on the filter.

Referring to FIG. 3, which shows the re-circulation circuit, liquid draining from the mash 36 passes through the settled solids which constitute the filter bed, and through the belt 20 and slotted plate 21 upon which the belt 20 rests. The liquid is then pumped by the re-circulating pump 37 to a height above the mash bed from which it can be sprayed over any desired part of the mash bed. The apparatus is kept at the desired temperature by means of a steam jacket shown in section at 31.

Figure 4:
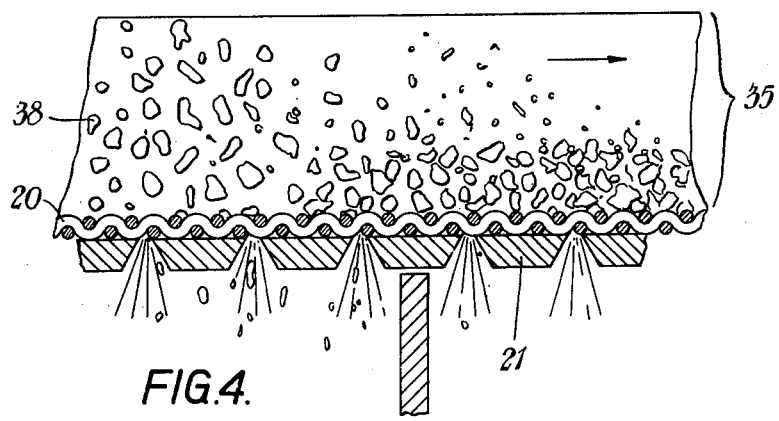
FIG. 4 is an enlarged sectional side view showing the mash as it begins to settle on the filter conveyor belt.

In FIG. 4 the mash is shown as it begins to settle on the conveyor belt. The solid particles 38 of the mash gradually settle until the filter bed 35 is stabilised. The resultant bed of solid particles forms an effective labyrinth filter and the fact that the bed does not move in relation to the moving belt on which it is carried, results in the minimum of disturbance to the particles once they have settled in place. This minimises the tendency to produce cloudy wort.

In the case where it is desired to carry out conversion of the mash and its subsequent filtration concurrently in time, but in sequence in space, on this perforated conveyor as the mash is being moved along by it, this may be done by extending the length of that portion of the conveyor upstream of the filtration zone between points X and Y (FIG. 2), so that it first passed over an imperforate platform of suitable length, heated at the appropriate places to the required temperature or temperatures, necessary to effect conversion. Any conventional heating means may be employed.

As a result of further experiments, we have developed yet another alternative method and apparatus for conversion of the mash, embodying the principle of the moving conveyor band, but so arranged as to permit easier control of the variations in temperature and "dwell" in the or each conversion zone, and hence to permit wider variation of the process according to whether it is meeting the requirements of the beer or ale brewer, or the widely different requirements of the lager brewer.

We provide, in one form, a method of converting the mash which consists in moving it at a controlled linear rate along a conveyor band (exemplified by a flat imperforate moving belt or belts), maintaining an appropriate conversion temperature for an appropriate time by heating one or more zones along the length of this conveyor, the dwell of the mash in the or each zone being determined by adjusting the relationship between the rate of travel of the or each belt and the linear length of the or each zone of the belt.

Alternatively, a series of belts may be employed sequentially each belt having one or more conversion zones heated to the required temperature and having a controlled dwell period determined as before by relating the linear length of conversion zone to the speed of the conveyor.

For simplicity, it is preferable to arrange that the mash is delivered by gravity from the end of one conveyor on to the beginning of the next, in cases where a plurality of conveyors is required.

Where it is important, as in most instances, that the temperature of the mash should not be allowed to fall during its transfer from one conversion zone to the next, and where a plurality of conveyors are being employed, means may be provided for heating the mash or maintaining its temperature, during its passage from one conveyor to the next.

By separating the conversion step from the filtration step (when both are carried out on moving conveyor belts) we are able to arrange the process so as to provide extreme flexibility of operation and ease of control whereas if a single perforated belt is employed as a conveyor and both conversion and filtration are carried out thereon, the belt is liable to be unnecessarily long, which in some cases may prove inconvenient if space is limited.

We claim:
1. A continuous filtration process for separating particulate solid materials from brewers wort, which comprises conveying a mixture of said wort and said solid materials continuously and at a controlled rate in a substantially horizontal linear direction through a filtration zone by means of a perforate conveyor moving in a trough; causing said solid materials to settle on said moving conveyor to form a settled and mechanically undisturbed filter bed of particles; moving said filter bed smoothly over a perforate platform above a wort collecting zone; draining wort through said filter bed, said perforate conveyor and said perforate platform and collecting said wort; and removing said solids from said conveyor at the downstream end of said filtration zone.

2. A continuous filtration process as defined in claim 1, wherein said filtration zone is divided into three regions, viz., (1) a stabilizing region at the upstream end of said filtration zone where first runnings of wort are drawn off and where said solid particles settle to form said filter bed; (2) a production region immediately downstream of said stabilizing region where strong wort is drawn off for subsequent use; and (3) a drainage region immediately downstream of said production region where the last of the wort is drawn off and from which said solid particles are removed.

3. A continuous filtration process as defined in claim 2, wherein wort is collected at several places along and underlying said filter bed throughout said filtration zone.

4. A continuous filtration process as defined in claim 3, wherein cloudy first runnings of wort collected from below said stabilizing region are re-circulated and sparged at least once over said filter bed thereby removing small particles from said wort.

5. A continuous filtration process as defined in claim 4, wherein said cloudy first runnings of wort are drawn successively from one part of said filter bed and are re-circulated and sparged over another part of said filter bed further downstream to produce increasing clarification of said wort.

6. A continuous filtration process as defined in claim 3, wherein strong wort is collected from below said production region and is continuously drawn off for subsequent use.

7. A continuous filtration process as defined in claim 3, wherein water is sparged over said filter bed at the downstream end of said filtration zone and weak wort is collected from below said drainage region.

8. A continuous filtration process as defined in claim 7, wherein said weak wort is sparged over said filter bed in said production region.

9. A continuous filtration process as defined in claim 7, wherein said weak wort is added directly to the outflow of strong wort from said production region.

10. A continuous filtration process as defined in claim 7, wherein a fraction of said weak wort is sparged over said filter bed in said production region and the remaining fraction is added directly to the outflow of strong wort from said production region.

11. A continuous filtration process as defined in claim 3, in which the collecting of wort from various places along said filter bed is carried out in such manner as to produce a gradual lowering of liquid level in said bed from the upstream to the downstream end of said filtration zone.

12. In a continuous mashing process which comprises the sequential steps of conversion of the mash and filtration of the spent grains from the wort and wherein said steps are separated in space from each other, and wherein said mash, after said conversion step, is continuously passed forward for separation of said wort from said spent grains; an improved separation and filtration step which comprises conveying said mash continuously and at a controlled rate in a substantially horizontal linear direction through a filtration zone by means of a perforate conveyor moving in a trough; causing said mash to settle on said moving conveyor to form a settled and mechanically undisturbed filter bed of grains; moving said filter bed smoothly over a perforate platform above a wort collecting zone; draining said wort through said filter bed; perforate conveyor and perforate platform and collecting said wort; and removing spent grains from said conveyor at the downstream end of said filtration zone.

13. A continuous mashing process including a continuous conversion step which conversion step comprises passing heated mash in controlled flow and under controlled temperature conditions into and through a confined space which constitutes a conversion zone; continuously mechanically agitating said mash throughout the passage of the latter through said conversion zone; transferring said heated and agitated mash from said conversion zone to a filtration zone without separating wort therefrom; and subsequently extracting the wort continuously by the filtration step according to claim 12.

14. A continuous mashing process which comprises the sequential steps of conversion of the mash and filtration of the spent grains from the wort, and wherein said steps are separated in space from each other, and in which said conversion step is continuous and comprises mixing grist and water continuously; passing said mixture continuously to at least one conversion zone constituted by a perforate moving conveyor belt operating in an appropriately heated imperforate trough; controlling the rate of travel of said mixture in said conversion zone in relation to the temperature obtaining in said conversion zone to effect conversion of said mash, and subsequently continuously extracting said wort by a filtration step according to claim 12.

15. A continuous mashing process as defined in claim 14, in which said steps of continuous conversion and continuous filtration are both carried out on the same perforated conveyor belt, said continuous conversion step being carried out in a conversion zone forming an extension upstream of said filtration zone and said mash, during conversion, being conveyed by said perforate conveyor belt over an appropriately heated imperforate platform and said mash, after conversion, being conveyed by said perforate conveyor belt to and through said filtration zone.

16. In a continuous mashing process, a filtration step as defined in claim 12, in which the mash and the wort being collected are kept hot during filtration.

References Cited in the file of this patent
UNITED STATES PATENTS

| | | |
|---|---|---|
| 341,801 | Fox | May 11, 1886 |
| 2,309,989 | Saltzman | Feb. 2, 1943 |
| 2,513,687 | Strezynski | July 4, 1950 |
| 2,726,957 | Kunz | Dec. 13, 1955 |

UNITED STATES PATENT OFFICE
CERTIFICATE OF CORRECTION

Patent No. 3,128,189                                      April 7, 1964

Percy Henry Watts et al.

It is hereby certified that error appears in the above numbered patent requiring correction and that the said Letters Patent should read as corrected below.

Column 9, line 7, for "bed;" read -- bed, --.

Signed and sealed this 28th day of July 1964.

(SEAL)

Attest:

ESTON G. JOHNSON
Attesting Officer

EDWARD J. BRENNER
Commissioner of Patents